United States Patent
Habets et al.

Patent Number: 6,063,273
Date of Patent: May 16, 2000

[54] APPARATUS FOR THE BIOLOGICAL PURIFICATION OF WASTE WATER

[75] Inventors: Leonard Hubertus Alphonsus Habets, Sneek; Antonius Johannes Hendrikus Hyacinthus Engelaar, Oppenhuizen; Sjoerd Hubertus Jozef Vellinga, Tjalleberd, all of Netherlands

[73] Assignee: Paques B.V., Balk, Netherlands

[21] Appl. No.: 09/306,413

[22] Filed: May 6, 1999

Related U.S. Application Data

[63] Continuation of application No. PCT/NL97/00592, Oct. 29, 1997.

[30] Foreign Application Priority Data

Nov. 6, 1996 [NL]  Netherlands ............................ 1004455

[51] Int. Cl.⁷ ................................. C02F 3/30; C02F 3/12; C02F 1/24
[52] U.S. Cl. ........................ 210/188; 210/218; 210/256; 210/195.1
[58] Field of Search ..................... 210/603, 605, 210/180, 188, 195.1, 196, 197, 202, 207, 218, 220, 256, 261, 262

[56] References Cited

U.S. PATENT DOCUMENTS

| | | | |
|---|---|---|---|
| 4,670,140 | 6/1987 | Aivasidis et al. ...................... | 210/188 |
| 4,735,723 | 4/1988 | Mulder .................................... | 210/603 |
| 4,735,724 | 4/1988 | Chynoweth et al. ................... | 210/218 |
| 5,116,505 | 5/1992 | Lourens ................................. | 210/603 |
| 5,147,547 | 9/1992 | Savall et al. .......................... | 210/196 |
| 5,230,794 | 7/1993 | Heijnen et al. ....................... | 210/188 |
| 5,306,422 | 4/1994 | Krofta ................................ | 210/195.1 |
| 5,500,118 | 3/1996 | Coenen et al. ....................... | 210/188 |
| 5,855,785 | 1/1999 | Heijnen et al. ....................... | 210/522 |
| 5,972,219 | 10/1999 | Habets et al. ........................ | 210/188 |

FOREIGN PATENT DOCUMENTS

| | | |
|---|---|---|
| 35 38 183 | 4/1987 | Germany . |
| 44 11 825 | 10/1995 | Germany . |
| 61-274798 | 12/1986 | Japan . |
| 1-231994 | 12/1989 | Japan . |
| WO 96/23735 | 8/1996 | WIPO . |

*Primary Examiner*—Thomas G. Wyse
*Attorney, Agent, or Firm*—Young & Thompson

[57] ABSTRACT

For the biological purification of waste water, use is made of a column containing a UASB reactor (1) at the bottom and an aerobic reactor (2) at the top. The two reactors (1; 2) are separated from one another by a partition (12) in which openings are provided to allow the anaerobic effluent through into the aerobic reactor. The partition (12) is situated at some distance above the gas collection means (8) in order to form a buffer zone (13) for anaerobic sludge which has flowed through. Preferably, a floatation apparatus (3) is mounted on the aerobic reactor in order to separate biomass from the purified water.

8 Claims, 1 Drawing Sheet

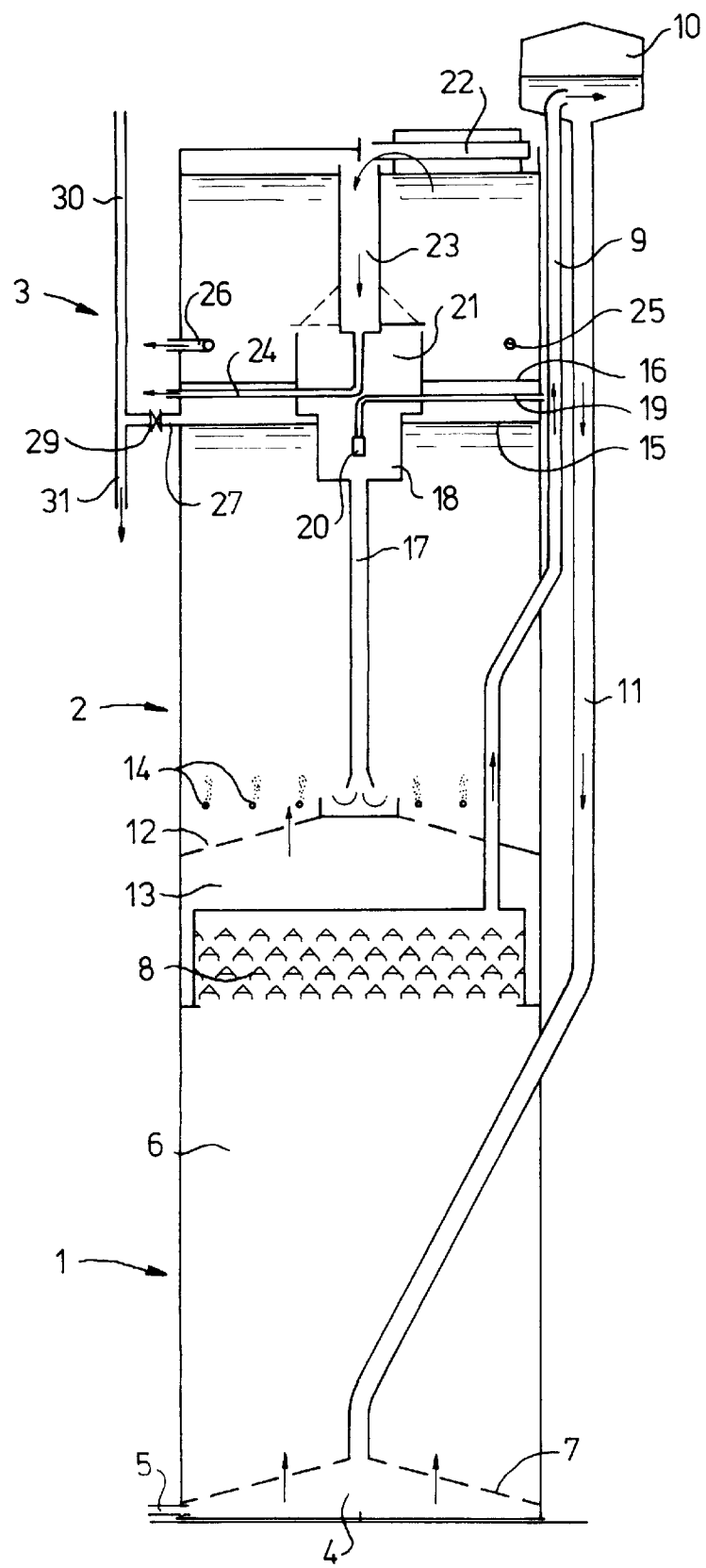

APPARATUS FOR THE BIOLOGICAL PURIFICATION OF WASTE WATER

This is a continuation of co-pending international application No. PCT/NL97/00592 filed on Oct. 29, 1997, which designated the United States of America.

The invention relates to an apparatus for the biological purification of waste water, comprising:
- a first part being an upflow anaerobic sludge blanket (UASB) reactor which has, at the bottom, a mixing section (4), at the top gas collection means (8) for collecting methane gas bubbles, and a fermentation section (6) which is present between the mixing section and gas collection means, which fermentation section is intended for biomass and the water to be purified,
- a second part being an aerobic reactor (2) mounted above the UASB-reactor (1), said aerobic reactor comprising means (14) for supplying air and/or oxygen, Such an apparatus is disclosed in International Patent Application WO96/23735.

Aerobic purification requires a relatively large amount of energy for aeration and results in a relatively large amount of solid waste in the form of surplus. However, the quality of the treated water is satisfactory. Anaerobic purification requires little or no energy and the amount of excess sludge is negligible. On the other hand, the quality of the treated water is generally unsatisfactory. If anaerobic and aerobic treatments are combined, the advantages of both methods are utilized, while the disadvantages are reduced. In the anaerobic part, the majority of the chemically oxidizable material (for example, 75%) is converted into methane gas the energy consumption and the sludge growth being low. The residual contamination is converted into sludge-type biomass and carbonic acid gas in the aerobic section. The savings are especially appreciable in the case of somewhat larger projects. In the case of small installations, the combination of anaerobic and aerobic purification is less attractive because the savings do not offset the additional investment for an aerobic purification and because there is often insufficient space. Mounting the anaerobic reactor and the aerobic reactor above one another, preferably in one tank, makes the combination of anaerobic and aerobic purification profitable even for smaller projects.

A possible drawback of the design disclosed in the abovementioned international patent application is that the anaerobic and the aerobic biomasses may mix with one another at the position of the transition from the one reactor to the other. As the result of the fact that the flow in the aerobic reactor may be fairly turbulent, the anaerobic biomass cannot sink back into the anaerobic reactor, which adversely affects the purification efficiency.

The object of the invention is to avoid this drawback and, for this purpose, the method mentioned in the introduction is characterized by a third part being a buffer zone for anaerobic sludge which has flowed upwards through the gas collection means, said buffer zone being confined at the top by a partition provided with openings and at the lower side by said gas collection means, said means for supplying air and/or oxygen being mounted above said buffer zone.

The partition ensures, inter alia, that the anaerobic sludge does not end up in the aerobic reactor and the aerobic sludge cannot sink into the anaerobic reactor. The aerobic effluent can flow into the aerobic reactor via the openings in the partition. In the calm buffer zone, any anaerobic sludge which has got in can be collected so that it can sink back into the anaerobic reactor chamber.

It is pointed out that the JP-A-61274798 (abstract) discloses an apparatus for treating organic waste water comprising a vessel having an anaerobic reactor in the lower part and an aerobic reactor in the upper part. Between both reactors a partition is situated to which pressurized air is supplied to inject air bubbles into the aerobic reactor. There is no buffer zone formed between the partition and gas collection means. Consequently the problem of avoiding anaerobic sludge from flowing into the aerobic reactor is not solved. Further the anaerobic reactor is not an UASB-reactor.

In addition, DE-A-4411825 discloses an apparatus for purification of waste water having an anaerobic section in the lower part and an aerobic section in the upper part. The organic substances are flocculated by an iron salt and the flocks and sludge of the aerobic part are introduced into the anaerobic part. There is no combination of a partition and a buffer zone to avoid anaerobic sludge from flowing into the aerobic section and aerobic sludge from flowing into the anaerobic section; on the contrary. Further U.S. Pat. No. 5,147,547 relates to an oxidation and biological reduction reactor for liquid to be treated by upward circulation and recirculation. A vessel is filled by a lower layer of lower density than the liquid to be treated and an upper layer of higher density than the liquid to be treated. A partition is situated between said lower and upper layers. The partition is provided with pintles as a central tube. This reactor does not give any indication to solve the problem of the solution on which the present invention is directed.

It is pointed out that the operation of the UASB reactor can be improved in a manner known per se by recirculating some of the effluent with the aid of the biogas acting as an internal pump (gas lift). In addition, some of the aerobic effluent can be recirculated via the anaerobic reactor in order to bring about denitrification.

In order to separate the aerobic biomass from the purified liquid, sludge separation means, for example a floatation apparatus, are preferably mounted on the aerobic reactor.

An efficient embodiment of the aerobic section comprises a central riser for feeding water up out of the aerobic reactor into a mixing chamber into which there debouches a pipe for supplying gas-bubble-rich recirculation water (white water). In addition, the mixing chamber mentioned may debouch at the top into a contact chamber in which water originating from the aerobic reactor, the gas-bubble-rich water and the water present in the floatation apparatus can mix with one another.

To remove the aerobic sludge separated, there may be provided, above the usual liquid level in the floatation apparatus, a floating layer skimmer which feeds the sludge which has collected on the liquid to a central sludge tank which is connected to a sludge recirculation pipe.

A drainage pipe having an expansion valve for the removal of foam and air can be provided at the top of the aerobic tank underneath the bottom of the floatation apparatus.

Water can be entrained with the gas from the anaerobic reactor by means of a gas-lift action. In order to separate said water from the gas and, at the same time, to promote the recirculation, the gas removal means of the anaerobic reactor can be connected, via a riser, to a gas chamber which is connected in turn via a downer (downcomer) to the mixing chamber just above the bottom of the apparatus.

Said mixing chamber just above the bottom of the apparatus is separated from the anaerobic reactor by a partition having openings.

Another oxygen-containing gas can also be fed into the aerobic reactor instead of air.

The invention will now be explained in greater detail by reference to the FIGURE which shows a diagrammatic reproduction of the apparatus according to the invention.

The apparatus shown is intended to purify waste water biologically and comprises an anaerobic reactor 1 of the UASB type, an aerobic reactor 2 and a floatation chamber 3. Said units are situated in a single, relatively high column (for example, 10 to 25 meters high). Said column is preferably a single tank.

The lowermost section—the UASB reactor 1—is provided at the bottom with a mixing chamber 4 into which the influent pipe 5 debouches. Said mixing chamber is separated from the actual anaerobic fermentation chamber 6 by a partition 7 having flow-through openings. Facilities known per se may be present in the mixing chamber 4 in order to mix the influent, for example tangentially debouching inlet pipes.

In the UASB reactor, contaminants are converted into methane. Provided in the uppermost section of the UASB reactor are gas collection hoods in which the methane formed in the chamber 6 is collected and fed via a riser 9 to a gas chamber 10. Water entrained with the gas collects in the chamber 10 and is fed back via a downcomer 11 to the mixing chamber 4.

The UASB reactor 1 is separated from the aerobic reactor 2 by a partition 12 having openings. Situated between the gas hoods 8 and the partition 12 is a buffer space 13 in which anaerobic sludge which has passed through the hoods 8 can collect so that it can sink back into the anaerobic reactor 1. The buffer space 13 is calm.

Situated above the partition 12 are means 14 for feeding air and/or oxygen into the aerobic reactor. In said reactor, contaminants are converted into essentially carbonic acid and biomass by means of aerobic bacteria. The liquid level in the reactor 2 is indicated by 15 and the closed partition between the aerobic reactor 2 and the floatation chamber 3 is indicated by 16.

The purified water which becomes superfluous as a result of feeding effluent from the UASB reactor leaves the aerobic reactor via the central pipe 17 and ends up in a mixing chamber 18 into which water with air dissolved into it can be fed via a pipe 19. At the end of the pipe 19 there is an expansion valve 20. Air bubbles which give the water a white colour are produced by the expansion.

The mixing chamber is followed by a contact chamber 21 in which the white water mixes with the water in the floatation chamber 3, as a result of which flocs are formed which are driven upwards by the air bubbles. A floating layer of biomass forms on the water in the floatation chamber.

By means of a floating layer skimmer 22, the biomass is fed into a central sludge tank 23 in which it is removed from the floatation chamber 3 via the pipe 24. The biomass can be fed back to the aerobic reactor 2. The effluent from the aerobic treatment leaves the floatation chamber 3 via the annular pipe 25 and the drainage pipe 26 and can be discharged into the sewer or the surface water free of sludge and solid matter. The excess biomass can be drained at set times to a sludge storage apparatus.

Situated at the position of the liquid level 15 in the aerobic reactor 2 is an outlet 27 for air together with any foam which debouches via the expansion valve 29 into a pipe 30 for removing air and a pipe 31 for removing foam.

Because the complex treatment (anaerobic, aerobic, floatation) takes place in a column having a relatively great height (10–25 meters), little floor space is occupied. In addition, a number of components are not needed which would indeed be needed in the case of a separate construction, such as drainage gutters, covering materials and ventilation facilities.

It goes without saying that all kinds of modifications and additional facilities are possible. For example, some of the aerobic effluent could be recirculated via the UASB reactor in order to bring about denitrification. The aeration could then be different from that described. Instead of air, pure oxygen can also be used.

What is claimed is:

1. Apparatus for the biological purification of waste water, comprising:

a first part being an upflow anaerobic sludge blanket (UASB) reactor which has, at the bottom, a mixing section (4), at the top gas collection means (8) for collecting methane gas bubbles, and a fermentation section (6) which is present between the mixing section and gas collection means, which fermentation section is intended for biomass and the water to be purified, a second part being an aerobic reactor (2) mounted above the UASB-reactor (1), said aerobic reactor comprising means (14) for supplying air and/or oxygen, characterized by a third part being a buffer zone (13) for anaerobic sludge which has flowed upwards through the gas collection means, said buffer zone being confined at the top by a partition (12) provided with openings and at the lower side by said gas collection means (8), said means (14) for supplying air and/or oxygen being mounted above said buffer zone (13).

2. Apparatus according to claim 1, characterized in that sludge separation means, for example a floatation apparatus (3), are mounted on the aerobic reactor (2) in order to separate biomass from the purified water.

3. Apparatus according to claim 1, characterized in that a central riser (17) is situated in the aerobic reactor (2) which is intended to feed water up out of the aerobic reactor (2) into a mixing section (18) into which there debouches a pipe (19) for supplying gas-bubble-rich water (white water).

4. Apparatus according to claim 3, characterized in that the mixing section (18) mentioned debouches at the top into a contact chamber (21) in which water originating from the aerobic reactor, the gas-bubble-rich water and the water present in the floatation apparatus mix with one another.

5. Apparatus according to claim 1 inclusive, characterized in that there is provided, above the usual liquid level in the floatation apparatus, a floating layer skimmer (22) which feeds the sludge which has collected on the liquid to a central sludge tank (23) which is connected to a sludge drainage pipe (24).

6. Apparatus according to claim 2, characterized in that, a drainage pipe (28) having a reducing valve (29) for the removal of air and foam is provided at the top of the aerobic reactor (2) underneath the bottom (19) of the floatation apparatus (3).

7. Apparatus according to claim 1, characterized in that the gas removal means (8) of the UASB reactor (2) are connected, via a riser (9), to a gas chamber (10) which is connected in turn via a downer (downcomer) (11) to the mixing chamber (4) just above the bottom of the apparatus.

8. Apparatus according to claim 7, characterized in that the mixing section (4) mentioned just above the bottom of the apparatus is separated from the UASB reactor (1) by a partition (7) having openings.

* * * * *